US006059414A

United States Patent [19]

Tsai

[11] Patent Number: 6,059,414

[45] Date of Patent: May 9, 2000

[54] REFLECTOR BELT

[76] Inventor: Yen-Shu Tsai, No. 3, Lane 62, Chung Hsiao Street, Chung Ho, Taipei Hsien, Taiwan

[21] Appl. No.: 09/351,628

[22] Filed: Jul. 12, 1999

[30] Foreign Application Priority Data

Jul. 13, 1998 [TW] Taiwan .................................. 87211244

[51] Int. Cl.[7] .......................................... G02B 5/12

[52] U.S. Cl. ......................... 359/516; 359/519; 362/103; 362/108

[58] Field of Search ............................ 359/516, 519; 362/103, 108

[56] References Cited

U.S. PATENT DOCUMENTS 4,523,258 6/1985 Morse et al. ............................ 362/108
4,709,307 11/1987 Branom .................................. 362/103
5,879,076 3/1999 Cross .................................... 362/103

*Primary Examiner*—Darren E. Schuberg
*Attorney, Agent, or Firm*—Dougherty & Troxell

[57] ABSTRACT

A reflector belt, which includes a light reflecting frame belt having an elongated base and a light reflecting layer covered on the elongated base, a flexible cover strip covered on the light reflecting layer of the light reflecting frame belt and fastened to two opposite end pockets at the light reflecting layer, and a LED circuit retained between the flexible cover strip and the light reflecting frame belt, the LED circuit having a plurality of LEDs respectively inserted into respective through holes at the cover strip.

6 Claims, 5 Drawing Sheets

REFLECTOR BELT

BACKGROUND OF THE INVENTION

The present invention relates to a reflector belt for use in a reflector vest for traffic policemen.

A reflector vest for traffic policemen or scavengers has light reflecting belts stitched to the fabric thereof, which reflect light. Recently, various flashing light circuit means have been developed for use with light reflecting belts for reflector vests or the like. In one commercially available reflector belt, LED circuit means is installed in a transparent plastic tube, and then installed in a cloth tube which is coated with a layer of reflecting substance. This structure of reflector belt has drawbacks. Because the reflector belt has a plastic tube in it, it does not fit well the movement of the user's body. Further, when passing through the plastic tube, the intensity of the light of the LED circuit means is weakened. There is also known another structure of reflector belt comprised of a light reflecting outer layer having through holes, and LEDs respectively fastened to the through holes at the light reflecting outer layer by rivets or snaps. This structure of reflector belt cannot well protect the rivets/snaps against rain water. Furthermore, the fabrication of the aforesaid two LED circuit embedded reflector belts is complicated and expensive.

SUMMARY OF THE INVENTION

The present invention has been accomplished under the circumstances in view. According to one aspect of the present invention, the reflector belt comprises a light reflecting frame belt having an elongated base and a light reflecting layer covered on the elongated base, a flexible cover strip covered on the light reflecting layer of the light reflecting frame belt and fastened to two opposite end pockets at the light reflecting layer, and a LED circuit retained between the flexible cover strip and the light reflecting frame belt, the LED circuit having a plurality of LEDs respectively inserted into respective through holes at the cover strip. According to another aspect of the present invention, bonding patches are installed to fixedly secure the circuit boards of the LED circuit to the light reflecting frame belt and the cover strip.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
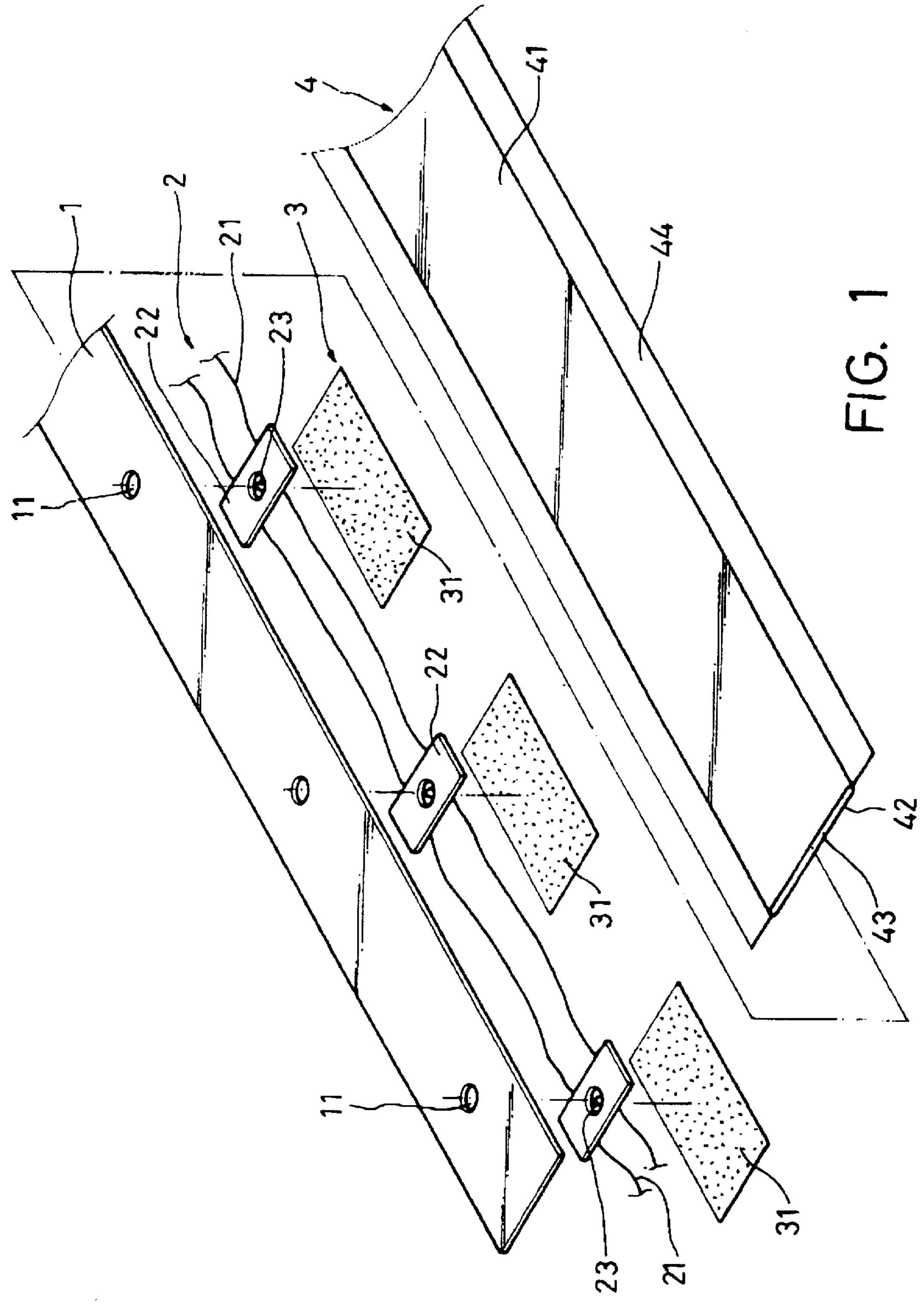
FIG. 1 is an exploded view of a reflector belt according to the present invention.
Figure 2:
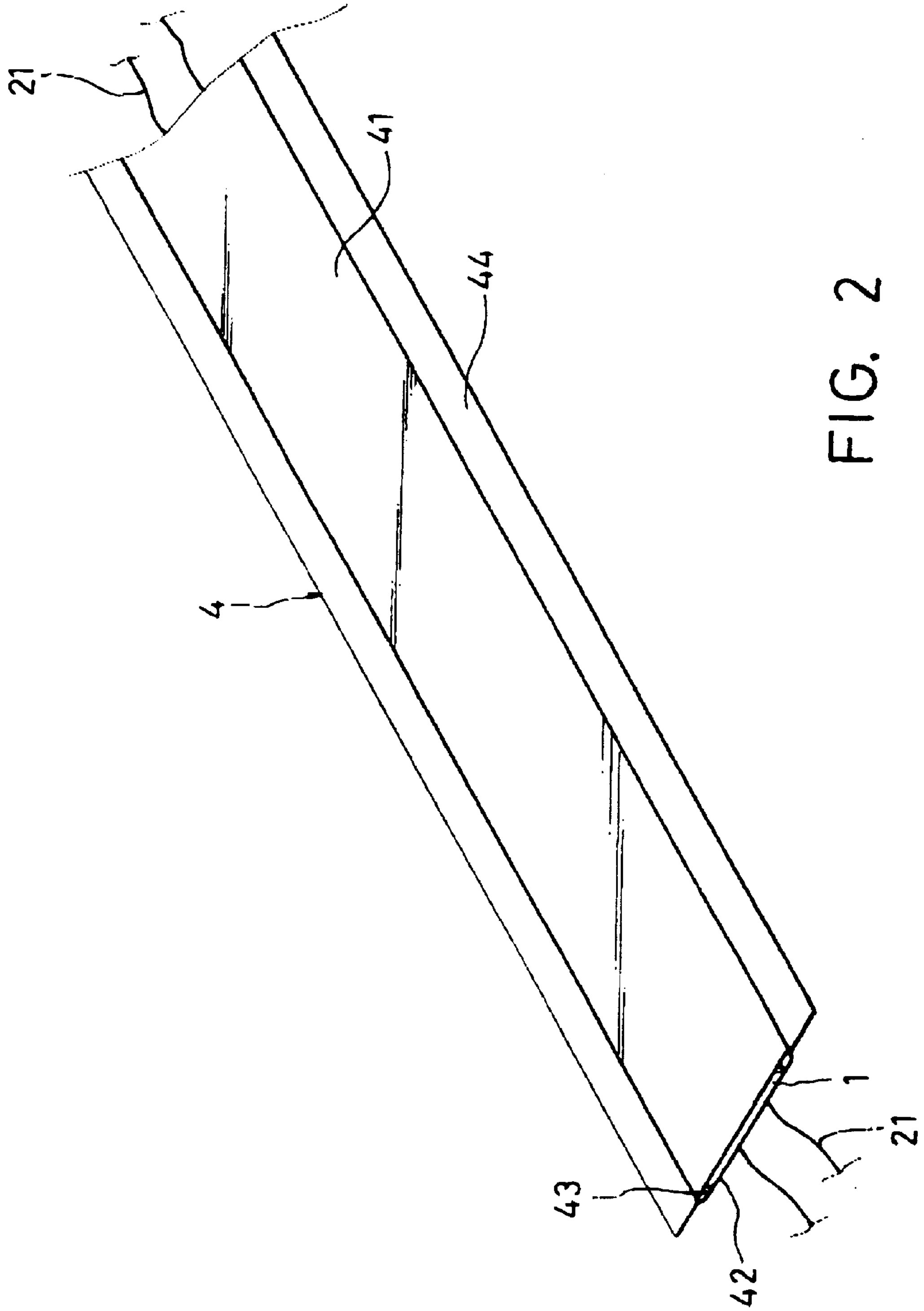
FIG. 2 is a perspective assembly view of the reflector belt shown in FIG. 1.

Referring to FIGS. 1 and 2, a reflector belt is shown comprising a cover strip 1, a LED circuit 2, a plurality of bonding patches 3, and a light reflecting frame belt 4.

The cover strip 1 is a thin sheet material molded from high molecular material, having a longitudinal series of through holes 11 through which light from the LED circuit 2 passes.

The LED circuit 2 is comprised of a plurality of circuit boards 22 connected in series by electric wires 21. Each circuit board 22 comprises a LED (light emitting diode) 23. The LED circuit 2 is retained between the cover strip 1 and the light reflecting frame belt 4. After installation, the LEDs 23 at the circuit boards 22 are respective inserted into the through holes 11 at the cover strip 1, and the electric wires 21 are connected to power supply.

The bonding patches 3 are coated with adhesive 31 and used to fixedly secure the circuit boards 22 of the LED circuit 2 of the light reflecting frame belt 4.

The light reflecting frame belt 4 comprises an elongated base 42, and a light reflecting layer 41 covered on the elongated base 42. The elongated base 42 comprises two end pockets 43 protruding over two opposite ends of the light reflecting layer 42 for receiving the ends of the cover strip 1, and two side flanges 44 for mounting, for example, for fastening to an apparatus by stitches.

Figure 4:
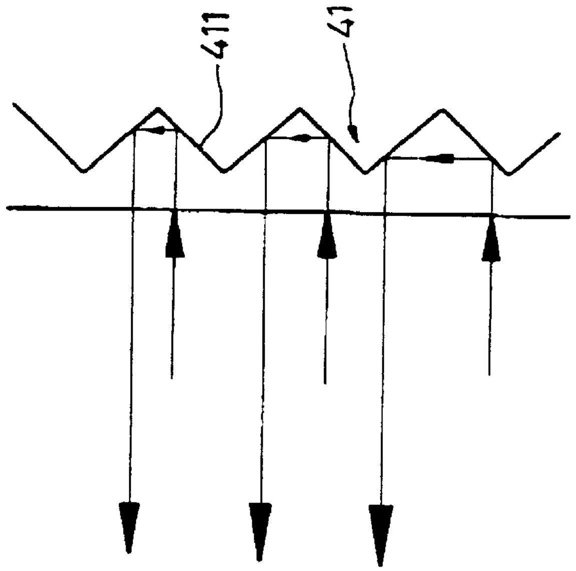
FIG. 4 is a schematic drawing showing light refracted and reflected by the triangular prisms at the light reflecting layer according to the present invention.
Figure 3:
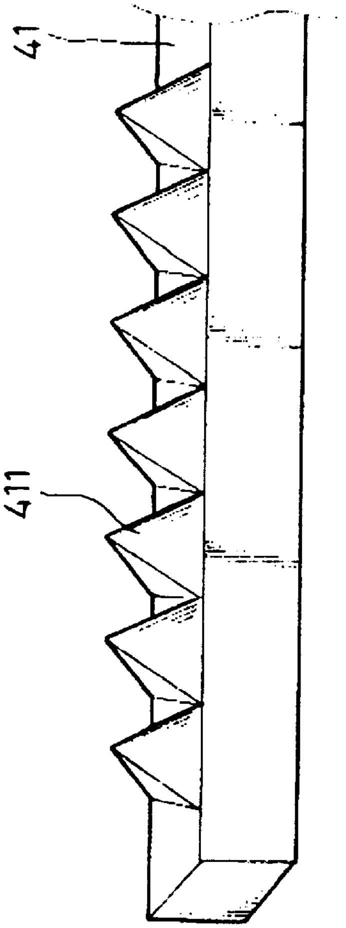
FIG. 3 is a sectional elevation in an enlarged scale of the light reflecting layer according to the present invention.

Referring to FIGS. 3 and 4 and FIG. 1 again, the light reflecting layer 41 comprises arrays of triangular prisms 411 raised from the back side wall thereof. When light passes through the light reflecting layer 41 from the from side, it is refracted and reflected by the triangular prisms 411, and therefore light intensity is reinforced. Further, the light refracting and reflecting effects of the triangular prisms 411 prevent dazzling of the light of the LEDs 23 of the LED circuit 2.

The assembly process of the reflector belt is outlined hereinafter with reference to FIGS. 1 and 2 again. The LEDs 23 of the LED circuit 2 are respectively inserted into the through holes 11 at the cover strip 1, then the cover strip 1 and the circuit boards 22 of the LED circuit 2 are adhered to the light reflecting layer 41 of the light reflecting frame belt 4, and then the two opposite ends of the cover strip 1 are respectively engaged into the end pockets 43 at the elongated base 42 of the light reflecting frame belt 4.

Figure 5:
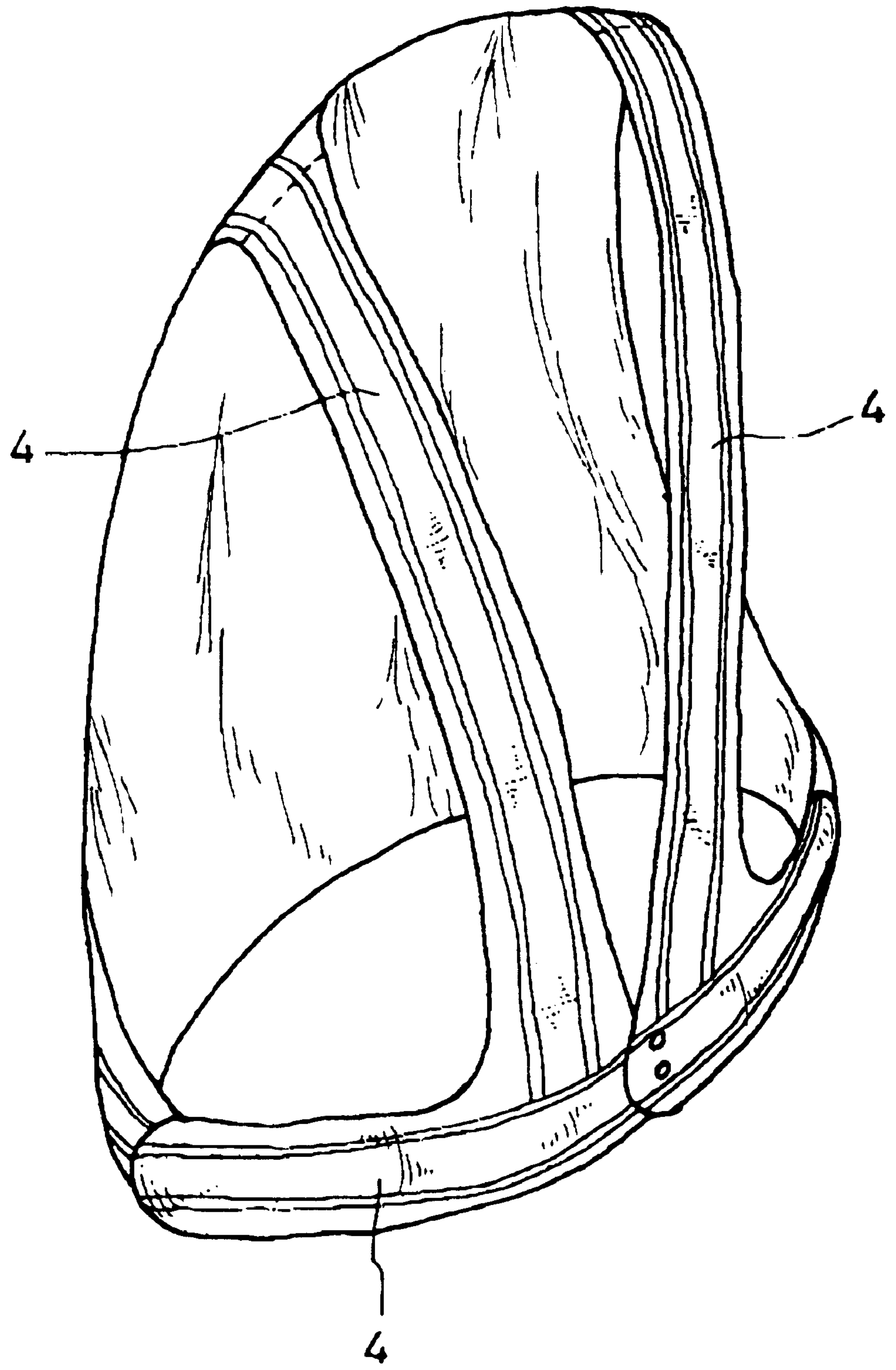
FIG. 5 illustrates an application example of the present invention.

Referring to FIG. 5 and FIG. 2 again, the light reflecting frame belt 4 of the reflector belt can be fastened to a reflector vest by bonding or stitches. Because the cover strip 1 and the light reflecting frame belt 4 are respective made of thin and flexible materials, the reflector belt can be closely attached to the fabric of the reflector vest without causing the reflector vest to deform.

Figure 6:
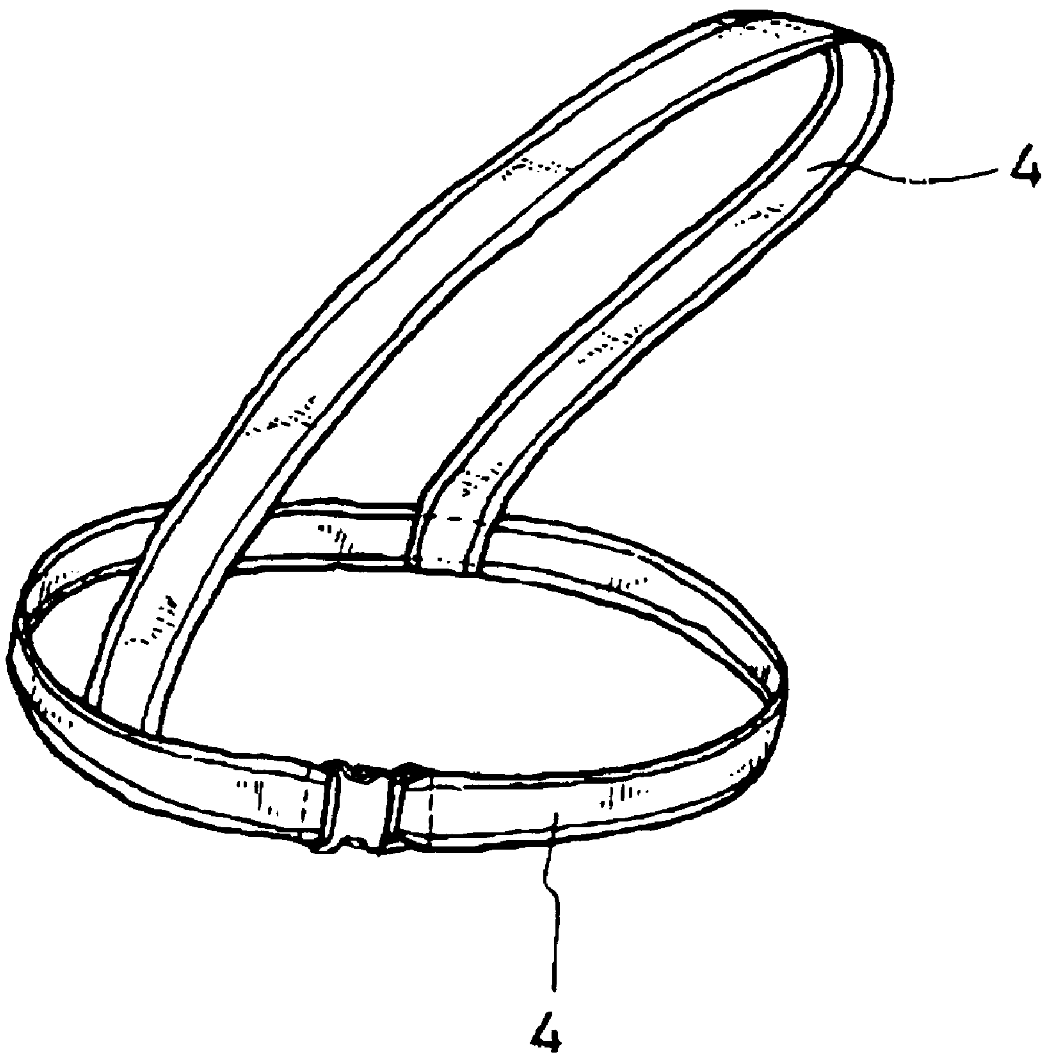
FIG. 6 illustrates another application example of the present invention.

Referring to FIG. 6, a number of reflector belts can be fastened together to form a reflector strap for fastening to body (waist and shoulders) of a traffic policeman.

Further, the light reflecting frame belt 4 and the assembly of the cover strip 1 and LED circuit 2 can be separately made, and then the light reflecting frame belt 4 and then the assembly of the cover strip 1 and LED circuit 2 are fastened together.

While only one embodiment of the present invention has been shown and described, it will be understood that various modifications and changes could be made thereunto without departing from the spirit and scope of the invention disclosed.

What the invention claimed is:

1. A reflector belt comprising:

a light reflecting frame belt, said light reflecting frame belt comprising an elongated base, and a light reflecting layer covered on said elongated base, said elongated base comprising two end pockets protruding over two opposite ends of said light reflecting layer;

a flexible cover strip covered on said light reflecting layer of said light reflecting frame belt, said cover strip comprising a longitudinal series of through holes, and two opposite ends respectively engaged into the end pockets at said elongated base;

a LED circuit retained between said flexible cover strip and said light reflecting frame belt, said LED circuit comprising a plurality of circuit boards connected in series by electric wires thereof, and a plurality of light emitting diodes respectively installed in said circuit boards and inserted into the through holes at said cover strip.

2. The reflector belt of claim 1 further comprising a plurality of bonding patches to fixedly secure said circuit boards of said LED circuit to said light reflecting frame belt and said cover strip.

3. The reflector belt of claim 1 wherein said elongated base of said light reflecting frame belt comprises two side flanges for mounting.

4. The reflector belt of claim 1 wherein said cover strip is made of high molecular material.

5. The reflector belt of claim 2 wherein said bonding patches are covered with a glue.

6. The reflector belt of claim 1 wherein said light reflecting layer comprises arrays of triangular prisms raised from a back side wall thereof.

* * * * *